Dec. 18, 1928.

S. C. McKEOWN ET AL 1,695,771

ENGRAVING MACHINE

Original Filed July 14, 1922  5 Sheets-Sheet 1

Inventors
Charles C. Bruckner
Samuel C. McKeown
By their Attorney

Dec. 18, 1928.

S. C. McKEOWN ET AL 1,695,771

ENGRAVING MACHINE

Original Filed July 14, 1922   5 Sheets-Sheet 3

Inventors
Charles C. Bruckner
Samuel C. McKeown
By their Attorney

Dec. 18, 1928.

S. C. McKEOWN ET AL 1,695,771

ENGRAVING MACHINE

Original Filed July 14, 1922    5 Sheets-Sheet 4

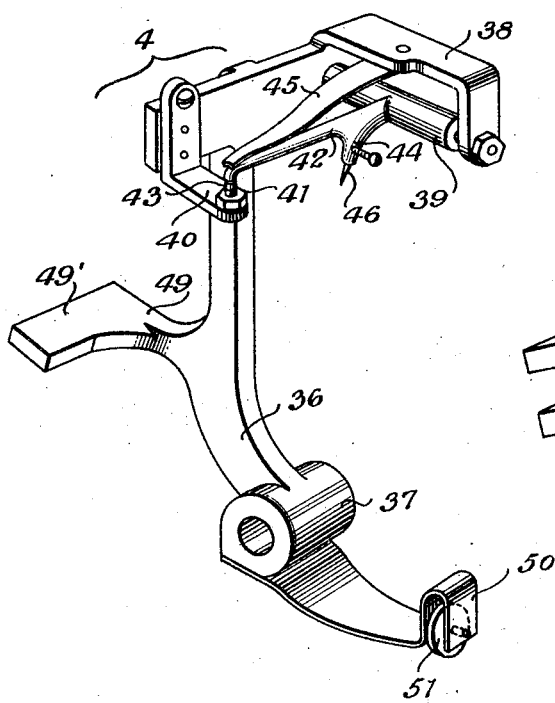
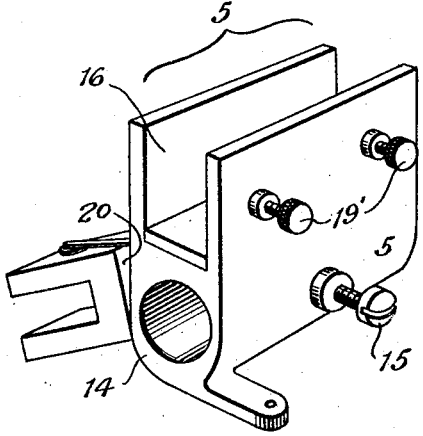
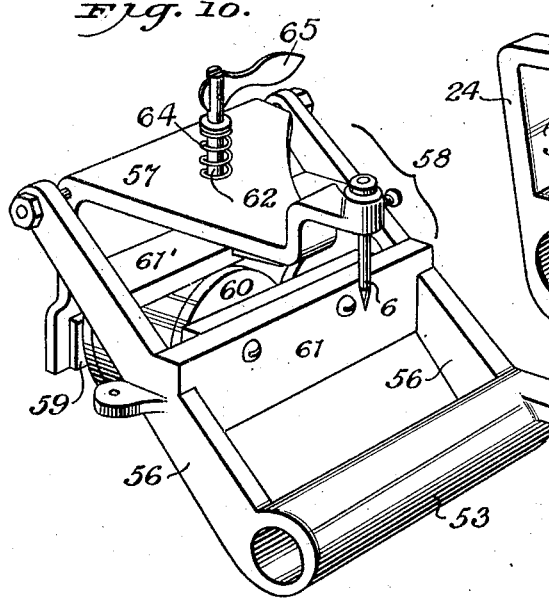
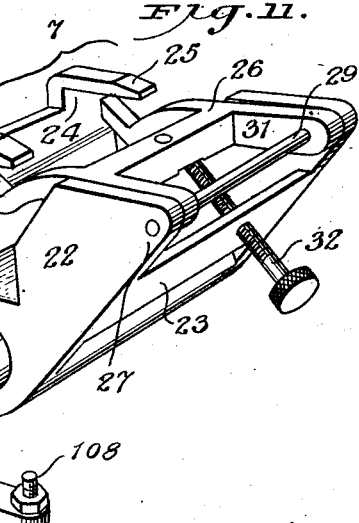

Patented Dec. 18, 1928.

1,695,771

UNITED STATES PATENT OFFICE.

SAMUEL C. McKEOWN, OF NEW ROCHELLE, NEW YORK, AND CHARLES C. BRUCKNER, OF IRONIA, NEW JERSEY, ASSIGNORS, BY MESNE ASSIGNMENTS, TO THE ENGRAVO-GRAPH CORPORATION.

ENGRAVING MACHINE.

Application filed July 14, 1922, Serial No. 574,977. Renewed July 13, 1928.

This invention relates to improvements in engraving machines of the general character disclosed in the pending application of Charles C. Bruckner, Serial No. 404,247, filed August 17, 1920, wherein a reproducing tool is electrically controlled by the movement of a tracer which in turn is caused to move by its engagement with a pattern.

An object of this invention is to provide a machine operating in substantially the same manner, yet a machine in which the desirable features of simplicity in construction and automaticity in operation are combined.

A further object is to provide a small compact machine particularly designed for engraving upon fountain pens and pencils, cigarette holders and other elongated cylindrical bodies, and a machine which is capable of engraving upon hard material of any kind.

So-called automatic machines of this character have heretofore required considerable skill in adjusting the work upon the holder, in setting a stop mechanism, in regulating the speed of operation, and in making other minor adjustments preparatory to or during the engraving process. Our improved machine eliminates the necessity for these fine adjustments and is sufficiently automatic to be comparatively fool proof and capable of operation by an unskilled attendant.

Other objects of the invention are the provision of means for appreciably reducing the amount of power consumed in the tool controlling electric circuit, and in so designing the parts that the entire machine may be manufactured and assembled at a comparatively small cost.

With these and other objects in view, the invention consists in certain novel features of construction and combinations and arrangements of parts as will be more fully hereinafter described and pointed out in the claims.

In the accompanying drawings,

Fig. 8 is an enlarged perspective view of the tracer carriage,

Fig. 9 is a similar view of the pattern holder,

Fig. 10 is a similar view of the tool carriage, and

Fig. 11 is a similar view of the work holder.

Figure 1:
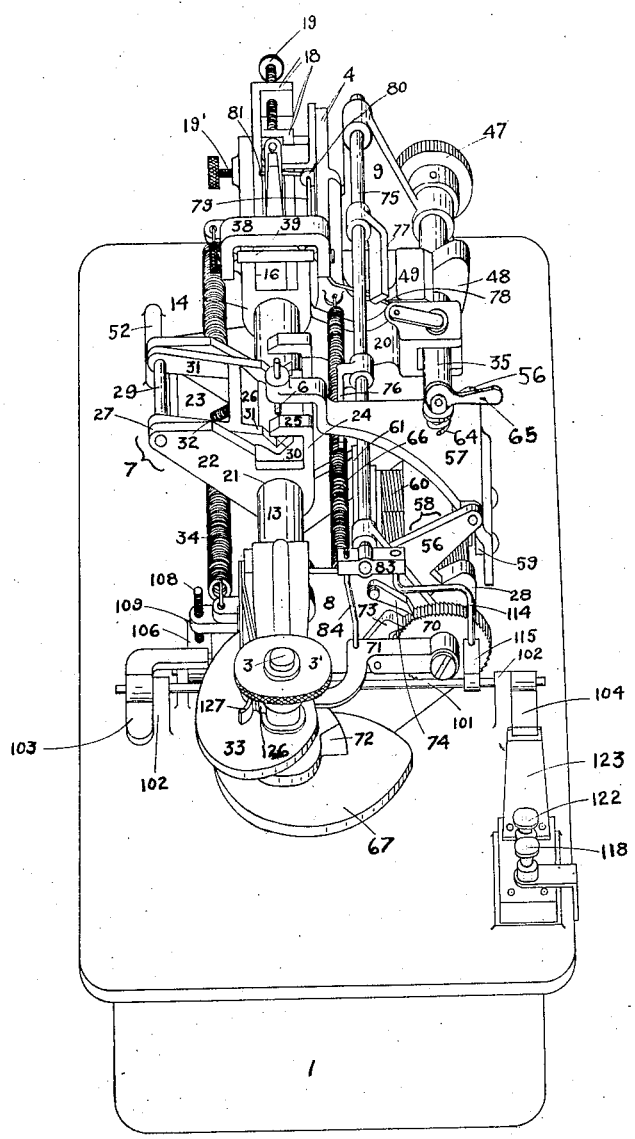
Figure 1 is a perspective view of my improved machine.

General construction.

Referring in detail to the drawings (Figure 1), we have used reference numeral 1 to designate a supporting base for the machine, preferably in the form of a box, housing at one end a spring motor 2, which drives a main driving spindle 3 in a manner to be set forth with particularity hereafter. A handwheel 3' may be provided for manually turning the spindle. Turning of the spindle operates to impart relatively reciprocating movement to a tracer carriage 4 and a pattern holder 5. A pivoted tracer 46 mounted in the tracer carriage is caused to move by its engagement with a pattern in the holder and this movement of the tracer controls the operation of a cutting tool 6, under which a work holder frame 7 is reciprocated in synchronism with the reciprocation of the pattern holder. The mounting of these parts and the means for operating the same will be described in detail hereafter.

Bearing frames 8 and 9 rising vertically from opposite ends of the base 1 are formed with integral bearing sleeves 10 providing mounting for a horizontal shaft 11. Similar sleeves 12 provide mounting for a second shaft 13 parallel to and located above the shaft 11.

Pattern holder (Fig. 9) and work holder (Fig. 11).

The pattern holder 5 and the work holder 7 are fixed to the shaft 13. The pattern holder includes a sleeve portion 14 receiving the shaft and rigidly secured thereto, preferably by a set screw 15. A pocket 16 formed in the holder is adapted to receive the type 17. Any suitable means may be utilized for securing the type in the holder and centering the same. I preferably utilize a pair of clamping members 18 (Figs. 1 and 2) operated by a screw 19 to grip the type and adapted to be held in properly centered position in the pocket by screws 19'. An arm 20 extending rearwardly from the pattern holder and preferably forming an integral part thereof is bifurcated to straddle and ride on a cam shaft 35 journalled in the frames 8 and 9 behind the shaft 11.

Figures 5, 6:
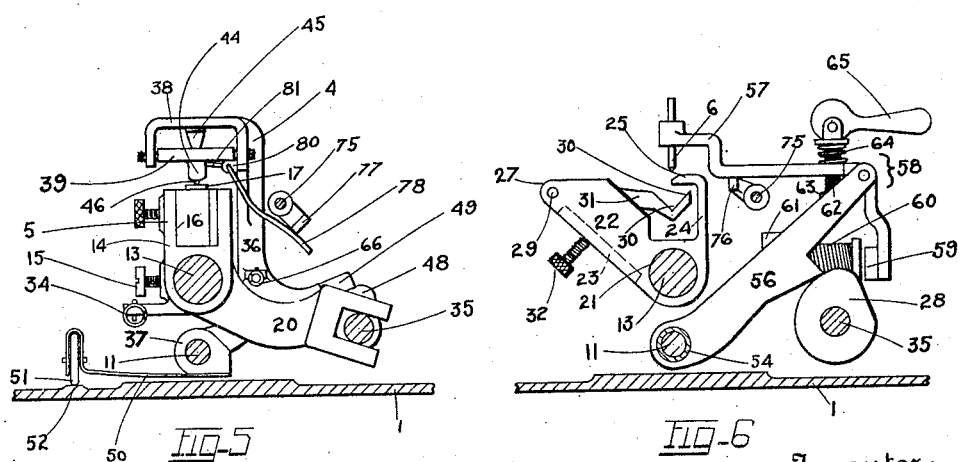
Figure 5 is a fragmentary transverse sectional view on the line 5—5 of Figure 2.
Figure 6 is a similar view on the line 6—6 of Figure 2.

The work holder frame 7 (Figures 1, 2 and 6) in like manner is bored at 21 to receive the shaft 13 and may be fixed to the shaft in any suitable manner. The work holder frame comprises a pair of side plates 22 integral with a connecting plate 23. The plates 22 terminate at their rear upper ends in ears 24 formed with horizontal extensions 25 which serve to engage work in a holder 26. This holder is pivoted between ears 27 formed by extensions of the other ends of the plates 22. A suitable cross pin 29 provides pivotal mounting for the holder. V-shaped recesses 30 in the free ends of the arms 31 of the holder are adapted to accommodate a fountain pen or other elongated and preferably cylindrical piece of work. By turning a screw 32 in the plate 23, the holder may be pivotally moved to bring the work therein into engagement with the under faces of the extensions 25 of the arms 24.

The shaft 13 carrying the pattern holder and the work holder frame is reciprocated in its bearings. Positive movement in one direction is imparted to this shaft by a cam 33 (Figure 1) on the spindle 3 and a coiled contraction spring 34 stretched between the pattern holder and the bearing frame 8 serves to quickly return the shaft after its release by the cam. The arm 20 prevents any tendency to rotate on the part of the shaft 13 during its reciprocating movement, thereby insuring the accurate movement in one horizontal plane of the work and the pattern.

*Tracer carriage (Fig. 8).*

The tracer carriage 4 (Figures 2 and 5) is fixed to the shaft 11 in any suitable manner, said tracer carriage comprising a curved frame 36 terminating at its lower end in a sleeve 37 fixed to the shaft 11. The upper end of the arm 36 which is relatively wide carries an inverted U-shaped bracket 38 in the legs of which a rock shaft 39 is mounted. An angle bracket 40 secured to the other side of the upper end of the arm 36 carries an electric contact 41. A tracer arm 42 is mounted on the rock shaft 39 and carries at its free end a contact 43 normally urged into engagement with the contact 42 by a flat spring 45 secured to the intermediate portion of the bracket 38. The tracer proper 46 is mounted in an off-set extension 44 of the tracer arm and is preferably shod with a diamond point. This tracer is located at an angle of approximately 60 degrees to the plane of the pattern so that it offers a minimum resistance thereto and the pattern can effect movement of the tracer arm with a very small amount of friction and wear on the type. The tracer only rides on the pattern during the working stroke of the machine since means is provided for mechanically supporting the same in elevated inoperative position upon the return stroke. This elevating mechanism will be more fully described hereafter.

The cam shaft 35 is journalled in bearings in the frames 8 and 9 and is provided at one end with a hand wheel 47 (Figure 1) for normally turning the same. A cam 48 on the cam shaft is engageable with the laterally flared end 49' of an arm 49 projecting rearwardly from the tracer carriage so that turning of the cam shaft operates to rock the tracer carriage forwardly as will be readily understood. Co-operating with the arm 49 to steady the carriage to take up wear on this arm and to insure the tight engagement of the end of said arm with the cam is a forwardly presented spring finger 50 fixed to the tracer carriage and carrying at its free end a roller 51, which rides on a raised track 52 on the base 1 as the tracer carriage is reciprocated. The carriage is thus positively and firmly held against oscillation during its reciprocation by the spring finger which at the same time provides a yielding element not sufficiently strong to interfere with the operation of the cam 48.

*Tool carriage.*

A tool carriage 58 (Figures 1, 2 and 6) is formed on its lower end with a sleeve 53 which is concentric with the shaft 11, said shaft passing through but providing no bearing for the sleeve. The sleeve is mounted at its ends on shoulders 54 of bearing blocks 55 which also serve as supplemental bearings for the shaft 11. Readwardly and upwardly extending arms 56 forming part of the carriage provide mounting at their upper ends for an angular lever 57. The offset forward end of the lever carries the cutting tool 6 and the depending rear end thereof supports an armature 59. The armature is adapted to be attracted by an electro-magnet 60 mounted on a cross bar 61 of the carriage. Energizing of the magnet operates to lift the tool off the work as will be evident and de-energizing thereof permits the tool to descend upon work in the holder.

A post 62 rising from a second cross bar 61' and passing through an opening in the horizontal arm of the lever has a collar 63 movable thereon and capable of being locked at any desired position to limit by its engagement with the cross bar 61' the forward rocking movement of the lever. The tension of a coiled expansion spring 64 around the post 62 between the lever and a sliding disc 61, the position of which is controlled by a cam 65 swivelled in the upper end of the post may be regulated by throwing the cam 65. Increased tension on the spring will operate to increase the power behind the descent of the tool and regulate its depth of cutting.

A coiled spring 66 is extended between the frame 8 and the tracer carriage 4. A cam 67 on the spindle 3 below the cam 33 engages with a roller 68 in the end of the shaft 11 to positively move the shaft in one direction and to regulate the speed of the shaft on its work stroke which is effected by spring 66. A similar roller 69 provides rolling contact between the shaft 13 and the cam 33.

Feed mechanism.

Exteriorly of the frame 8 a ratchet wheel 70 (Figure 1) is mounted on a reduced extension of the cam shaft 35. A lever 71 pivoted on this extension of the shaft includes a hooked end adapted to be lifted by a cam 72 on the spindle 3 above the cam 67 upon each revolution of the spindle. Lifting of the lever 71 compels a pawl 73 carried thereby to advance the ratchet wheel 70, turning the cam shaft 35 and operating through the medium of the cam 48 and a cam 28 engageable with the tool carriage to rock the tracer carriage and tool carriage whereby the tracer and tool are fed forwardly. This feeding movement occurs after each reciprocation of shafts 11 and 13. A second pawl 74 pivoted upon the frame 8 holds the ratchet wheel in advanced position and positively prevents retrograde movement thereof.

A light shaft 75 mounted in the frames 8 and 9 above and behind the shaft 13 carries a pair of angle brackets 76 and 77 respectively. The bracket 76 upon rocking of the shaft 75 engages under the lever 57 to mechanically lift the tool independently of the magnet. The bracket 77 engages a crank arm 78 on a crank shaft 79 mounted in brackets 80 on the tracer carriage. This crank shaft carries a crank finger 81 which operates to positively lift the tracer arm as the crank arm 78 is engaged by the bracket 77. A torsion spring 82 (Fig. 2) around the shaft 79 prevents vibration thereof and maintains the crank arm 78 in proper position. Rocking of the shaft 75 is affected by a block 83 secured to the end thereof which is actuated by a push bar 84 urged upwardly by the lever 71 as the lever rides over the cam 72.

Driving and stop mechanisms.

Figure 2:
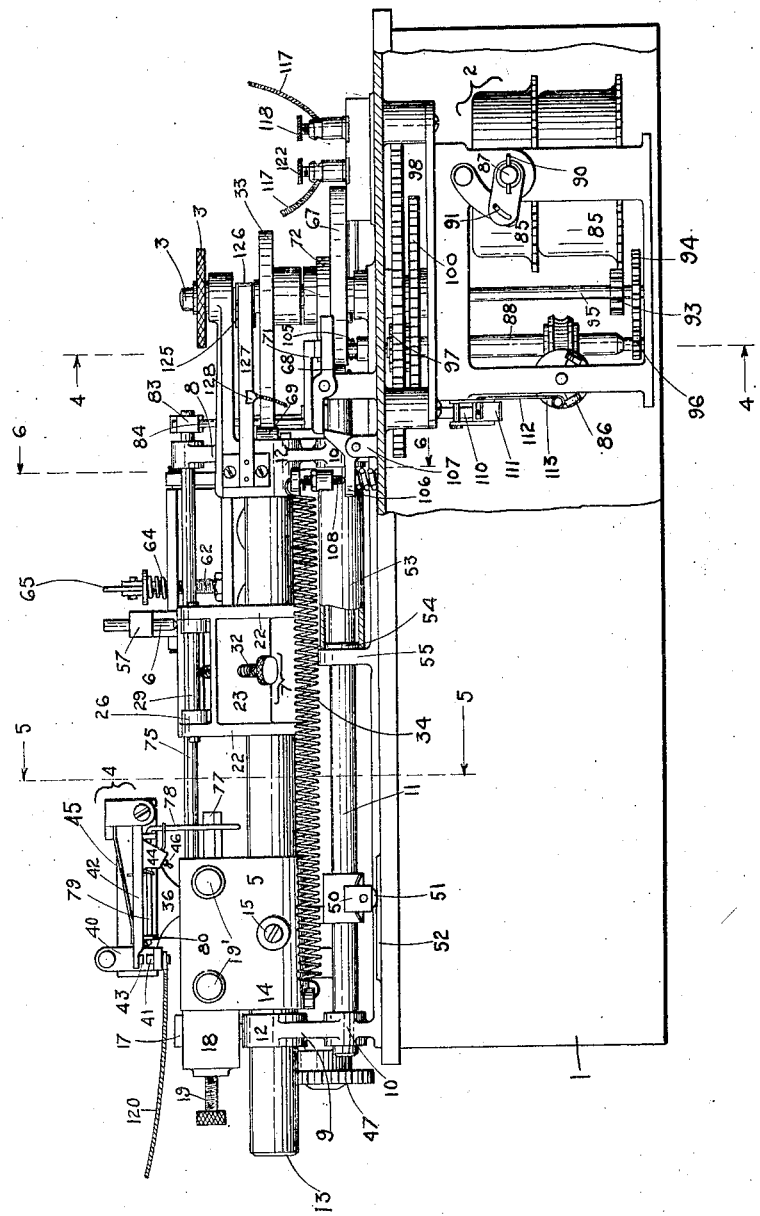
Figure 2 is a view in front elevation thereof with parts broken away and in section for clearness.
Figure 3:
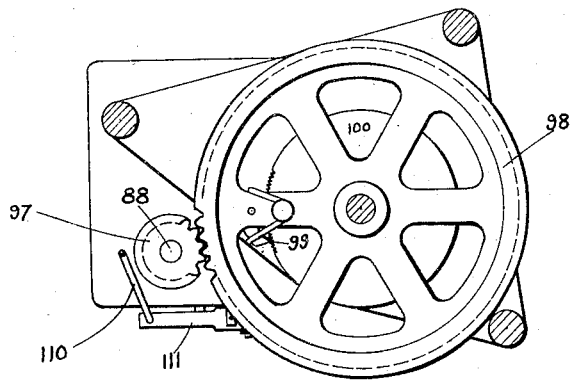
Figure 3 is a plan view of the motor.
Figure 4:
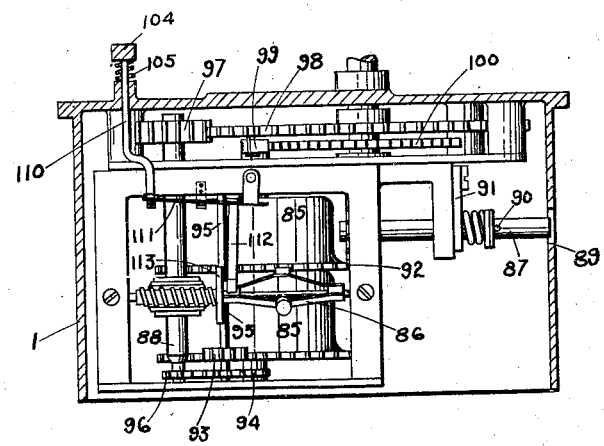
Figure 4 is a view in transverse section on the line 4—4 of Figure 2.

Almost any conventional type of hand wound spring motor capable of fitting into one end of the box-like base 1 may be utilized as a driving means. We have illustrated a motor 2 (Figures 2, 3 and 4) including the usual drums 85, governor 86, winding shaft 87 and driving shaft 88. The end of the winding shaft 87 is exposed through an opening 89 in the wall of the base 1, so that a suitable crank handle (not shown) may be attached thereto for winding the motor. A clutch pin 90 on this shaft is engaged by the handle and a conventional ratchet mechanism 91 is employed to prevent accidental unwinding. The drums are turned in the usual manner as at 92 to wind the springs of the motor and the drums in turn drive through a pinion 93 and gear 94 on a vertical countershaft 95 to a pinion 96 on the driving shaft 88. A pinion 97 on the upper end of the driving shaft meshes with a speed reducing gear 98 mounted idly on the driving spindle 3. A pawl 99 carried by the gear 98 adjacent its periphery serves to positively drive the ratchet wheel 100 keyed to the spindle. By using this pawl, there is no lost motion when the springs 34 and 66 cause the spindle 3 to overrun the motor on the idle stroke of the machine, since this over-running of the motor will cause the pawl to gain a few teeth on the ratchet wheel 100 as will be readily understood.

A transverse shaft 101 (Figure 1) is mounted in brackets 102 adjacent frame 8 and carries at its forward end a trigger 103. A crank arm 104 at the rear end of the shaft 101 is normally urged upwardly to depress the trigger by an expansion spring 105. The trigger may be supported in elevated position against the action of spring 105 by a spring pressed trip lever 106 pivotally mounted in a bracket 107 adjacent the trigger. The position of the trip lever is controlled by a set screw 108 mounted in a forwardly presented extension 109 of the rocking tool carriage. A rod 110 extending into the base 1 and located directly under the crank arm 104 operates through the medium of a lever 111 to control the position of a brake arm 112 relative to a friction disc 113 on the governor shaft. Whenever the trigger is released, the pull bar 114 connecting the block 83 on the shaft 75 and a block 115 on the shaft 101 positively operates shaft 75 to mechanically lift the tracer and tool in the manner already noted.

Electric circuits.

Figure 7:
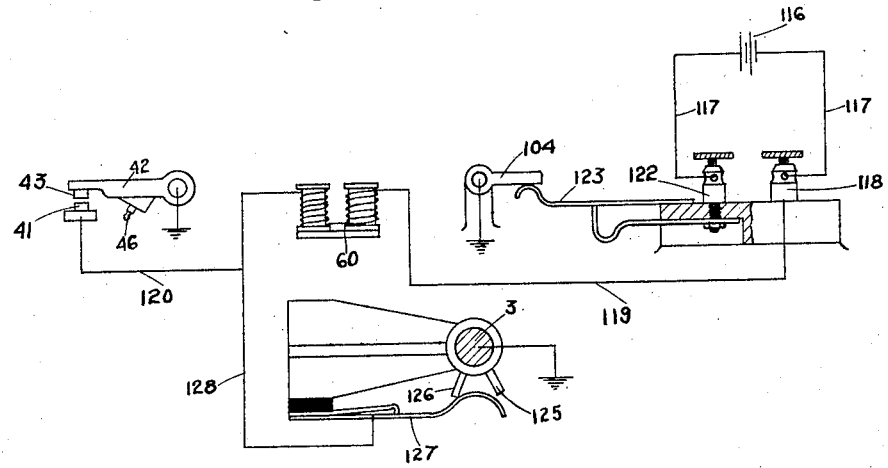
Figure 7 is a diagram of the electric circuits.

The current for electrically controlling the operation of the cutting tool may be supplied by a small battery indicated at 116 (Figure 7). The conductors 117 to the battery are connected to binding posts or other suitable terminals 118 and 122 on the base. A conductor 119 connects post 118 to the electromagnet 60 and another conductor 120 from the magnet leads to the fixed contact 41. The circuit is grounded through a resilient conductor 123 attached to the binding post 122 and through the contacts 41 and 43. The conductor 123 is held in engagement with the crank arm 104 by its own resiliency and incidentally acts to aid spring 105.

The spring 45 normally maintains the contacts 41 and 43 closed thereby closing the circuit, energizing the magnet 60, attracting the armature 59 and lifting the tool 6 clear of the work. Movement of the tracer arm caused by the engagement of the tracer point with the pattern opens the contacts 41 and 43 thereby breaking the circuit, de-energizing the magnet and allowing the cutting tool to descend by gravity and by the action of the spring 64.

Provision is also made for grounding the circuit at each end of the working stroke of the machine (Figures 1 and 7). This grounding means includes a pair of cams 125 and 126 on the spindle 3 which successively engage with a spring contact member 127 mounted on the frame 8 and insulated therefrom. The contact member 127 is in circuit with the magnet 60, a conductor 128 being used to connect the contact member and magnet. The purpose of this grounding which electrically holds the tool in elevated position independently of the position of the tracer will be later set forth.

Operation.

In operation, suitable type is set up in the pattern holder. An article to be engraved upon is placed on the work holder and moved into position under the extensions 25 of the arms 24 as above described. The hand-wheel 47 is turned to rock the tracer carriage and tool carriage rearwardly until the tracer is behind the row of type. Clamping of the work in the holder automatically properly spaces it relative to the tool.

Assuming the motor to be wound, moving of the trigger until it is held by the trip plate will release the brake 112 moving it away from the disc 113 and permitting operation of the motor. The adjustment of this brake incidentally regulates the speed of the motor since it acts as a limiting means for the movement of the disc 113 on the governor shaft.

As the motor turns, it operates through the mechanism hereinbefore described to reciprocate the work under the tool and to impart relative reciprocating movement to the tracer and pattern. Since both the pattern and tracer move simultaneously in opposite directions and since the tool is stationary and the work holder moves at the same speed as the pattern the length of the engraved design will be considerably shorter than the length of the pattern. The magnet 60 is normally energized attracting the armature 59 and holding the tool off the work, but breaking of the circuit when the pattern engages the tracer and elevates the contact de-energizes the magnet and permits spring urged actuations of the tool into cutting relationship with the work. The tool carriage and tracer carriage are fed forwardly after each reciprocation by the previously described action of the cam 72, lever 71, pawls 73 and 74 and ratchet wheel 70 thereby advancing the tool and the stylus preparatory to cutting an advanced line of engraving. The cam 28 is preferably smaller than the cam 48 so that the throw of the tool carriage is less than the throw of the tracer carriage. This necessarily results in a reproduction of the work of considerably less height than the type in the pattern. This reduction in size of the reproduction is conducive to fine work, whereas enlarging of the reproduction would cause deterioration in the sharply defined clearness of the reproduced characters.

At the same time that the pawl 73 is operating to feed the pattern and tool carriages forwardly, the shaft 75 is turning as above noted to mechanically lift the tracer and tool during the idle stroke of the machine. At each end of the work stroke, the circuit is grounded through the contacts 127 and one of the cams 125, 126 to electrically maintain the tool in elevated position. This does away with any danger of chipping the work at the ends of the work stroke (1) during the time that the tracer arm 42 is positively lifted by the crank finger 81 and the bracket 76 is moving into position to elevate the tool lever and (2) during the time that the contacts 41 and 43 are closing again and the bracket 77 is moving away from the tool.

It has been previously noted that the shaft 11 and the shaft 13 are spring actuated at alternate periods so that the two springs serve to compensate for each other and prevent undue vibration or strain on the movable parts.

When the tool carriage has moved forwardly the proper distance the screw 108 will operate the trip lever 106 to release the trigger 103'. This result serves to simultaneously stop the machine, elevate the tool and tracer and thereby break the electric circuit in the manner above set forth.

For the convenience of unskilled operators, it is preferable to use direct reading type in setting up the pattern, but if at any time it becomes desirable to use reverse reading type, the cam 48 may be shifted through an arc of 180 degrees on its shaft and will then serve to move the tracer carriage in an opposite direction to the tool carriage. The use of reverse reading type is thus made possible.

We have illustrated one of the preferred embodiments of the invention, but it is to be understood that numerous changes and alterations might be made in the general form of the parts described without departing from the invention, and hence we do not wish to limit ourselves to the details set forth, but shall consider ourselves at liberty to make such slight changes and alterations as fairly

We claim:

1. In a reproducing machine, a relatively movable tracer and pattern, a reproducing tool, means whereby movement of the tracer caused by its engagement with the pattern during their relative movement in one direction electrically controls the operation of the tool, and means for mechanically supporting the tool in inoperative position during relative movement of the tracer and pattern in the opposite direction.

2. In a reproducing machine, a relatively movable tracer and pattern, a reproducing tool, means whereby movement of the tracer caused by its engagement with the pattern during their relative movement in one direction electrically controls the operation of the tool, and automatically operable means for mechanically supporting the tool in inoperative position during relative movement of the tracer and pattern in the opposite direction.

3. In a reproducing machine, a relatively movable tracer and pattern, a reproducing tool, means whereby movement of the tracer caused by its engagement with the pattern during their relative movement in one direction electrically controls the operation of the tool, and automatically operable mechanical means for holding the tracer off the pattern and the tool in inoperative position during relative movement of the tracer and pattern in the opposite direction.

4. In a reproducing machine, a relatively movable tracer and pattern, a reproducing tool, means whereby movement of the tracer caused by its engagement with the pattern during their relative movement in one direction electrically controls the operation of the tool and automatically operable mechanical means for preventing the engagement of the tracer and pattern during relative movement of the tracer and pattern in the opposite direction.

5. In an engraving machine, a reciprocating element, a pattern holder and a work holder carried by said element, a tracer adapted to ride over the pattern as the element is reciprocated, a tool mounted adjacent the work holder and tool operating means controlled by the position of the tracer, a cam shaft, means associated with the cam shaft for advancing the tracer over the pattern, and independent means associated with the cam shaft for simultaneously advancing the tool over the work holder upon each reciprocation of said element.

6. In an engraving machine, a relatively movable pattern and tracer, a relatively movable tool and work holder, means for simultaneously reciprocating the pattern and work holder, means for advancing the tool, and means for advancing the tracer, said two means operating simultaneously after each reciprocation of the pattern and work holder.

7. In an engraving machine, a relatively movable pattern and tracer, a relatively movable tool and work holder, means for simultaneously reciprocating the pattern and work holder, means for simultaneously advancing the tool and tracer after each reciprocation of the pattern and work holder, rockingly mounted carriages wherein the tool and tracer are supported, and means for rocking the carriages upon each reciprocation of the pattern and work holder.

8. In a reproducing machine, a relatively reciprocable tracer and pattern, a reproducing tool, means for electrically controlling operation of the tool upon relative reciprocation of the tracer and pattern in one direction, and means for shutting off the electric power upon their relative reciprocation in the opposite direction.

9. In a reproducing machine, a relatively reciprocable tracer and pattern, a reproducing tool, means for electrically controlling operation of the tool upon relative reciprocation of the tracer and pattern in one direction, means for shutting off the electric power upon their relative reciprocation in the opposite direction, said means comprising a contact making mechanism controlled by movement of the tracer, and means for rendering said mechanism inoperative upon relative movement of the pattern and tracer in one direction.

10. In a reproducing machine, a relatively reciprocable tracer and pattern, a reproducing tool, means for electrically controlling operation of the tool upon relative reciprocation of the tracer and pattern in one direction, means for shutting off the electric power upon their relative reciprocation in the opposite direction, said means comprising a contact making mechanism controlled by the movement of the tracer and automatically operable mechanical means for rendering said mechanism inoperative upon relative movement of the pattern and tracer in one direction.

11. In a reproducing machine, a relatively reciprocable tracer and pattern, a reproducing tool, means for electrically controlling operation of the tool upon relative reciprocation of the tracer and pattern in one direction, means for shutting off the electric power upon their relative reciprocation in the opposite direction, said means comprising a contact making mechanism controlled by the movement of the tracer and means for rendering said mechanism and said tool inoperative upon relative movement of the pattern and tracer in one direction.

12. In a reproducing machine, a relatively movable tracer and pattern, a tool, means whereby movement of the tracer caused by its engagement with the pattern electrically controls the operation of the tool, a rockingly mounted tracer carrying arm normally parallel to the pattern, said tracer being located at an angle of less than 90 degrees to the plane of the pattern whereby to offer a minimum resistance thereto upon relative movement of tracer and pattern in one direction.

13. In a reproducing machine, a relatively movable tracer and pattern, a tool, means whereby movement of the tracer caused by its engagement with the pattern electrically controls the operation of the tool, a rockingly mounted tracer carrying arm normally parallel to the pattern, said tracer being located at an angle of less than 90 degrees to the plane of the pattern whereby to offer a minimum resistance thereto upon relative movement of tracer and pattern in one direction, and means for mechanically holding the tracer out of the path of travel of the pattern during their relative movement in the opposite direction.

14. In an engraving machine, a simultaneously reciprocable pattern and work holder, a rockingly mounted tracer carriage and tool carriage respectively associated with said pattern and work holder, means for rocking said carriages forwardly upon each reciprocation of the pattern and work holder.

15. In an engraving machine, a simultaneously reciprocable pattern and work holder, a rockingly mounted tracer carriage and tool carriage respectively associated with said pattern and work holder, means for rocking said carriages forwardly upon each reciprocation of the pattern and work holder, driving means, and a stop mechanism for said driving means operable when one of said carriages is moved to a pre-determined position.

16. In an engraving machine, a simultaneously reciprocable pattern and work holder, a rockingly mounted tracer carriage and tool carriage respectively associated with said pattern and work holder, means for rocking said carriages forwardly upon each reciprocation of the pattern and work holder, driving means, a stop mechanism for said driving means operable when one of said carriages is moved to a pre-determined position, a trigger controlling said stop mechanism and trigger retaining means adapted to be moved to inoperative position by one of said carriages in its rocking movement.

17. In an engraving machine, a simultaneously reciprocable pattern and work holder, single means for effecting simultaneous reciprocation thereof, a tracer carriage, a tool carriage, a cam shaft, means operable upon reciprocation of the pattern and work holder for turning the cam shaft, and means whereby turning of the cam shaft rocks the tracer carriage and work carriage forwardly a pre-determined distance.

18. In an engraving machine, a simultaneously reciprocable pattern and work holder, single means for effecting simultaneous reciprocation thereof, a tracer carriage, a tool carriage, a cam shaft, means operable upon reciprocation of the pattern and work holder for turning the cam shaft, and means whereby turning of the cam shaft rocks the tracer carriage and work carriage forwardly a predetemined distance, said means comprising cams carried by the shaft and engageable with said carriages.

19. In an engraving machine, a reciprocating bar, a driving spindle, a cam on the spindle adapted to positively move the bar in one direction and a spring adapted to return the bar, a work holder and pattern on the bar, rockingly mounted tracer and tool carriages, a cam shaft, cams thereon engageable with the carriages to rock the same forwardly upon each reciprocation of the bar.

20. In an engraving machine, a reciprocating bar, a driving spindle, a cam on the spindle adapted to positively move the bar in one direction and a spring adapted to return the bar, a work holder and pattern on the bar, rockingly mounted tracer and tool carriages, a cam shaft, cams thereon engageable with the carriages to rock the same forwardly upon each reciprocation of the bar, and means controlled by said driving spindle for turning the cam shaft.

21. In an engraving machine, a reciprocat bar, a driving spindle, a cam on the spindle adapted to positively move the bar in one direction and a spring adapted to return the bar, a work holder and pattern on the bar, rockingly mounted tracer and tool carriages, a cam shaft, cams thereon engageable with the carriages to rock the same forwardly upon each reciprocation of the bar, means controlled by said driving spindle for turning the cam shaft, and automatically operable mechanical means positively operated by said driving spindle for turning the cam shaft.

22. In an engraving machine, a reciprocating bar, a driving spindle, a cam on the spindle adapted to positively move the bar in one direction and a spring adapted to return the bar, a work holder and pattern on the bar, rockingly mounted tracer and tool carriages, a cam shaft, cams thereon engageable with the carriages to rock the same forwardly upon each reciprocation of the bar, and a stop mechanism operable upon rocking movement of one carriage to a predetermined position.

23. In an engraving machine, a reciprocating bar, a driving spindle, a cam on the spindle adapted to positively move the bar in one direction and a spring adapted to return the bar, a work holder and pattern on the bar, rockingly mounted tracer and tool carriages, a cam shaft, cams thereon engageable with the carriages to rock the same forwardly upon each reciprocation of the bar, a stop mechanism operable upon rocking movement of one carriage to a pre-determined position, said stop mechanism including a trigger means normally retaining said trigger in inoperative position and adapted to be moved by said carriage to release said trigger.

24. In an engraving machine, a driving motor, a relatively movable pattern and tracer, a relatively movable tool carriage and work holder, a stop mechanism, and means controlled by the position of the tool carriage for operating said stop mechanism.

25. In an engraving machine, a driving motor, relatively movable pattern and tracer, a relatively movable tool carriage and work holder, a stop mechanism, means controlled by the position of the tool carriage for operating said stop mechanism, and means associated with the stop mechanism for regulating the speed of the motor.

26. In an engraving machine, a driving motor, a relatively movable pattern and tracer, a relatively movable tool carriage and work holder, a stop mechanism, means controlled by the position of the tool carriage for operating said stop mechanism, and means whereby stopping of the motor automatically moves the tracer and tool to inoperative position.

27. In an engraving machine, a driving motor, a relatively movable pattern and tracer, a relatively movable tool carriage and work holder, a stop mechanism, means controlled by the position of the tool carriage for operating said stop mechanism, means whereby stopping of the motor automatically moves the tracer and tool to inoperative position, and a tool operating circuit controlled by the tracer and broken upon movement of the tracer to inoperative position.

28. In an engraving machine, a reciprocating element, a pattern and a work holder carried thereby, a second reciprocating element, a tracer carriage mounted thereon, a tool carriage, means for rocking said carriages forwardly after each reciprocation of said elements.

29. In an engraving machine, a reciprocating element, a pattern and a work holder carried thereby, a second reciprocating element, a tracer carriage mounted thereon, a tool carriage, means for rocking said carriages forwardly after each reciprocation of said elements, and means whereby the tracer carriage is rocked further than the tool carriage upon each reciprocation.

30. In an engraving machine, a reciprocating work holder and pattern, rockingly mounted tracer and tool carriages, driving means, a stop mechanism operable upon rocking of one of said carriages to a pre-determined position.

31. In an engraving machine, a reciprocating work holder and pattern, rockingly mounted tracer and tool carriages, driving means, a stop mechanism operable upon rocking of one of said carriages to a pre-determined position, and adjustable means fixed to said carriage for operating said mechanism.

32. In an engraving machine, a cutting tool, a reciprocating pattern, a tracer, means whereby movement of the pattern on its work stroke acts on the tracer to electrically control the operation of the cutting tool, and means for mechanically supporting the tracer out of the path of travel of the pattern on its idle stroke.

33. In an engraving machine, a cutting tool, a reciprocating pattern, a tracer, means whereby movement of the pattern on its work stroke acts on the tracer to electrically control the operation of the cutting tool, and mechanical means for rendering the tool inoperative upon the idle stroke of the pattern.

34. In an engraving machine, a cutting tool, a reciprocating pattern, a tracer, means whereby movement of the pattern on its work stroke acts on the tracer to electrically control the operation of the cutting tool, and mechanical means for breaking the tool controlling circuit and supporting the tool in inoperative position upon the idle stroke of the pattern.

35. In an engraving machine, a cutting tool, a reciprocating pattern, a tracer, means whereby movement of the pattern on its work stroke acts on the tracer to electrically control the operation of the cutting tool, and mechanical means for holding the tracer out of the path of travel of the pattern and moving the tool to inoperative position upon the idle stroke of the pattern.

36. In an engraving machine, a reciprocating work holder, a tool and means for feeding the tool in an arc transverse to the plane of travel of the work holder.

37. In a reproducing machine, a reciprocating work holder and a reciprocating tool mounted for movement in an arc transverse to the plane of travel of the worker holder.

38. In a machine for reproducing on curved surfaces, a reciprocating work holder, a cutting tool and means for moving the tool in a curved path transversely of the path of travel of the work holder.

39. In an engraving machine, a combination with a suitable supporting base and a cutting tool and a pattern, a tracer carriage, means for reciprocating the carriage over the pattern, means for rocking the carriage after each reciprocation thereof, resilient means preventing accidental oscillation of the carriage as it is reciprocated.

40. In an engraving machine, a combination with a suitable supporting base and a cutting tool of a pattern, a tracer carriage, means for reciprocating the carriage over the pattern, means for rocking the carriage after each reciprocation thereof, resilient means acting to maintain said carriage pressed against its rocking means as it is reciprocated.

41. In an engraving machine, a combination with a suitable supporting base and a cutting tool of a pattern, a tracer carriage, means for reciprocating the carriage over the pattern, means for rocking the carriage after each reciprocation thereof, resilient means acting to maintain said carriage pressed against its rocking means as it is reciprocated, said means comprising a spring finger fixed to the carriage.

42. In an engraving machine, a combination with a suitable supporting base and a cutting tool of a pattern, a tracer carriage, means for reciprocating the carriage over the pattern, means for rocking the carriage after each reciprocation thereof, resilient means acting to maintain said carriage pressed against its rocking means as it is reciprocated, said means comprising a spring finger fixed to the carriage, and a roller journalled in the finger and riding on the base.

43. In an engraving machine, a combination with a suitable supporting base and a cutting tool of a pattern, a tracer carriage, means for reciprocating the carriage over the pattern, means for rocking the carriage after each reciprocation thereof, resilient means acting to maintain said carriage pressed against its rocking means as it is reciprocated, said means comprising a spring finger fixed to the carriage, and a roller journalled in the finger and riding on the base, said rocking means comprising a cam, and an arm fixed to the carriage adapted to be lifted by said cam against the action of the spring finger.

44. In an engraving machine, a reciprocating work carrying element, driving means therefor adapted to positively move said element in one direction, means for returning said element with sufficient speed to overrun said driving means, and means for preventing less motion between the driving means and said element.

45. In an engraving machine, a reciprocating work carrying element, driving means therefor adapted to positively move said element in one direction, means for returning said element with sufficient speed to overrun said driving means, and a ratchet mechanism preventing lost motion with driving means when the movement of said element overruns the driving means.

46. In an engraving machine, a tracer, a pattern, an engraving tool, a work holder, means for reciprocating the pattern with the work holder in one sense and reciprocating the tracer in the opposite sense while the tool is relatively fixed, and means whereby engagement of the tracer with the pattern during their relative movement in one direction electrically controls the operation of the tool.

47. In an engraving machine, a tracer, a pattern, an engraving tool, a work holder, means for reciprocating the pattern with the work holder in one sense and reciprocating the tracer in the opposite sense while the tool is relatively fixed, means whereby engagement of the tracer with the pattern during their relative movement in one direction electrically controls the operation of the tool, means for maintaining the tool inoperative during relative movement of the tracer and the pattern in the opposite direction, and means for advancing the tracer and the tool while the tool is inoperative.

48. In an engraving machine, a relatively movable pattern and tracer, a work holder movable with the pattern and a tool relatively fixed with respect to the motion of the work holder, means for simultaneously reciprocating the pattern with the work holder, means for reciprocating the tracer with respect to the tool, and means for advancing the tool and the tracer after each reciprocation of the pattern and work holder, the advance of the tracer being relatively greater than that of the tool.

49. In an engraving machine, a relatively movable pattern and tracer, a work holder movable with the pattern and a tool relatively fixed with respect to the motion of the work holder, means for simultaneously reciprocating the pattern and the work holder, means for reciprocating the tracer with respect to the tool and means for advancing the tool and the tracer after each reciprocation of the pattern and work holder, the advance of the tracer differing in extent from that of the tool.

50. The method of controlling the scale of reproduction of a pattern on a piece of work which consists in controlling the operation of a tool on the work by engagement of the tracer on the pattern, moving the pattern with the work relatively to the tool, and moving the tracer relatively to the tool.

51. The method of reproducing a pattern on a piece of work at a reduced scale of length which consists in controlling the operation of a tool on the work by engagement of a tracer on the pattern, and producing a relative movement in one direction of the pattern and the work with respect to the tool, while producing a relative movement in the opposite direction of the tracer with respect to the tool.

52. The method of making a reduced reproduction of a pattern on a piece of work which consists in controlling the operation of a tool on the work by engagement of a tracer on the pattern, producing a relative reciprocation in one sense between the pattern and the work on the one hand and the tool on the other, while producing relative reciprocation of the tracer and the tool in the opposite sense, advancing the tool at the end of each reciprocation and advancing the tracer at the end of each reciprocation farther than the tool.

53. The method of making a reduced reproduction of a pattern on a piece of work which consists in controlling the operation of a tool on the work by engagement of a tracer on the pattern, reciprocating the pattern and the work in one sense and the tracer in the opposite sense while the tool is maintained stationary, and advancing the tracer and the tool at the end of each reciprocation, the tracer being advanced farther than the tool.

54. The method of controlling the scale of reproduction of a pattern on a piece of work which consists in controlling the operation of a tool on the work by engagement of a tracer on the pattern, producing opposite reciprocation of the tracer and pattern, and simultaneously producing relative reciprocation between the tool and the work, one of which remains stationary.

SAMUEL C. McKEOWN.
CHARLES C. BRUCKNER.